Nov. 4, 1952
T. H. A. CORNALBA
2,616,212
ANIMAL CAPTURING APPARATUS
Filed Aug. 25, 1948
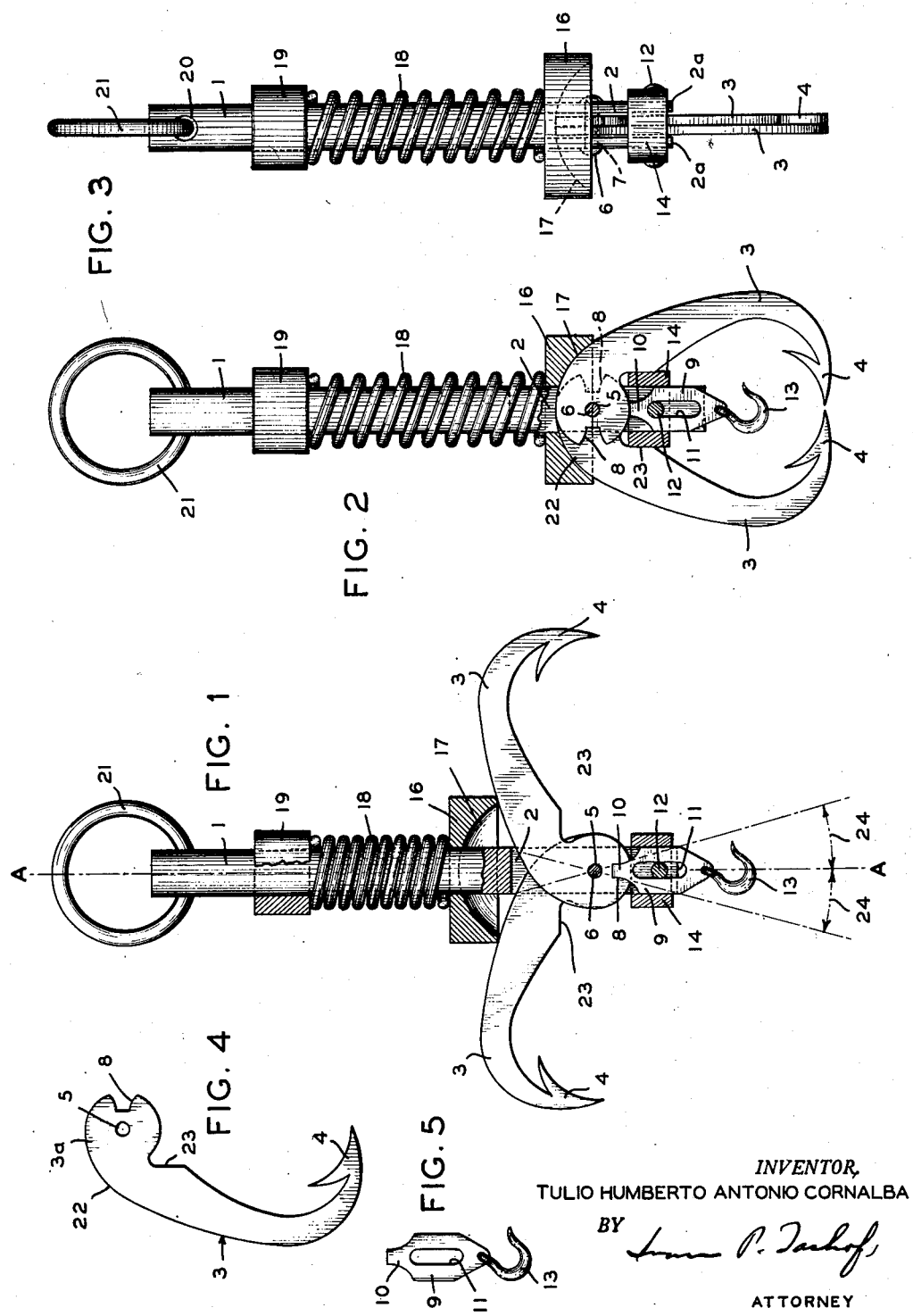
INVENTOR,
TULIO HUMBERTO ANTONIO CORNALBA
BY
ATTORNEY Patented Nov. 4, 1952

2,616,212

UNITED STATES PATENT OFFICE 2,616,212

ANIMAL CAPTURING APPARATUS

Tulio Humberto Antonio Cornalba,
Buenos Aires, Argentina

Application August 25, 1948, Serial No. 46,097
In Argentina August 29, 1947

7 Claims. (Cl. 43—89)

This invention relates to animal capturing apparatus and more especially to apparatus of the type including a member adapted to be baited, and is hereinafter described particularly though not exclusively, in relation to fishing, and therefore, as embodied in a device adapted to replace known fish hooks as used on fishing lines with or without rods, ground lines, night lines and the like.

As thus embodied my invention comprises one or more movable elements including means adapted to pierce and hold a fish when the latter takes or nibbles the bait and a latch connected to said bait and arranged for snap action release by the fish, resilient means allowing potential energy to be accumulated to operate the mechanism of the apparatus and to actuate the abovementioned movable elements. Said movable elements are arranged to move in paths which are so dependent on the relative position of the bait and of the movable elements that the latter when at the end of their operative motion may strike and pierce some part of the body of the fish, in proximity to the bait.

Moreover the apparatus may be provided with means for loading or setting the apparatus, such loading means being connected to said resilient means and adapted to apply the force of the load directly to the movable elements.

It is evident that an apparatus possessing the fundamental features disclosed above will make fishing easier since it often happens that fish will pull at the bait, and even pull it off the hook, without swallowing the latter, which is one way in which fish may be caught in fishing methods making use of a hook. Moreover, when the apparatus is provided with said loading means, such loading may be performed readily and with little risk to the user.

In the accompanying drawings:

Fig. 1 shows a part sectional front view of the apparatus, in open position;

Fig. 2 shows a part sectional front view of the apparatus in closed position;

Fig. 3 shows a side view of the same embodiment illustrated in Figs. 1 and 2 in the same aspect as in Fig. 2;

Fig. 4 is a side view of movable element provided with a sharpened portion adapted to be driven into the fish; and Fig. 5 is an enlarged front view of the latch member.

The embodiment illustrated in Figures 1, 2 and 3 comprises: A stem 1 having at one of its ends, a longitudinally extending slot 2, spaced parallel legs 2a and two movable elements 3 within the slot, each provided with a sharp end or piercing member 4 adapted to be driven into the body of the fish. Said elements 3 are moreover provided with a head end 3a having a perforation 5 in each. A pivot-pin 6 for said movable elements 3, passes through the perforations 5 of each of said elements 3 and connects the latter to stem 1 passing through holes 7 made for this purpose in said legs 2a. Each movable element 3 is provided with a latching notch 8 adapted to be engaged by a latch member 9, provided with a latching tooth 10 suitably shaped to engage said notches 8. Latch 9 has a centrally disposed elongated slot 11 and is provided at its end remote from tooth 10 with a baitable member such as hook 13. A guide ring 14 surrounds the slotted end of stem 1 and is rigidly secured thereto by pin 12 extending through legs 2a of stem 1 across the slot 2 thereof and freely through slot 11 of latch member 9, which can thus move in slot 2 relatively to pin 12. It will be seen that the latch member is thus slidably guided in the ring and limited in its movement by the pin.

An actuating ring member 16 having a convex face 17 is slidably mounted on stem 1, the face of said ring nearest said elements 3 being preferably, though not necessarily concave so as to engage the contact edges 22 of member 3.

A spring 18 surrounds stem 1 on the side of actuating ring 16 remote from slot 2 and the end of said spring remote from actuating ring 16 abuts against collar 19 fast on the stem 1, and the other end of the spring engaging said actuating ring 16. A suspension ring 21 passing through a hole 20 is connected to said stem adjacent the unslotted end thereof and provides a convenient means for securing the apparatus to a fishing line.

The elements 3 may be made from sheet material. Said elements 3 have outer contact edges 22, so that when placed as illustrated in Figs. 1, 2 and 3, the lower edge of actuating ring 16 will rest on said contact edges 22; moreover elements 3 have a flat edge portion 23 serving to limit their motion by engagement of flat 23 with guide ring 14. The thickness of elements 3, at least in the portion over which said elements 3 move within slot 2, is such that the sum of the thickness, will be only slightly smaller than the width of the slot 2. The latch member 9, which is flat, is preferably slightly thinner than the width of slot 2, so that tooth 10 will have a thickness equal or substantially equal to the sum of the thicknesses of the two elements 3, and may thus act as a latching device for said elements 3 by simultaneously engaging both notches 8 when the latter are alined as shown in Figure 1. The outside diameter of ring 16, is of a size to enable it to be gripped by the fingers while loading of the apparatus as will hereinafter appear.

Collar 19 and the upper end of stem 1 may be a single piece secured, as by screwing, to the rest of stem 1; it is also possible to make of one single piece the unit formed by collar 19 and the whole of stem 1, but in that event the assembly sequence would be reversed.

Ring 14 may be modified extending it upwards into a fork, the legs of which may then be utilized as retaining members to hold pivot pin 6 in place.

Referring more especially to the release mechanism of the apparatus shown in Figure 1, it should be noticed that notch 8 provided on each movable element should have a form such that at least the edge of said notch 8 laterally resting against tooth 10 when the latter acts as a stop, makes a suitable angle 24 with the longitudinal axis A—A of stem 1, said angle, with which a lateral edge of tooth 10 should register, should be of a size to provide through friction between notch 8 and tooth 10, a resistance counterbalancing the torque set up in elements 3 by action of spring 18 and at the same time to allow tooth 10 to disengage itself readily from notches 8 when a small force acting on latch 9 tends to drag the latter downwards.

In view of the fact that the apparatus is intended to be used in rust producing media, its parts should be made of rust-proof materials.

Operation of apparatus illustrated in Figures 1, 2 and 3 is as follows: As illustrated in Figure 1, the apparatus is in loaded position, that is, the movable elements 3 are separated or open as to their free ends, tooth 10 engages both notches 8 which are alined with each other and acts to prevent movement of elements 3, spring 18 is compressed between ring 16 and collar 19, and slidable ring 16 strongly presses its lower edge against eccentric edges 22 of elements 3. Under these conditions, if the apparatus is held by suspension ring 21 and a smaller effort is exerted pulling on hook 13, said effort will cause latch 9 to slide lengthwise of stem 1 guided by slot 11, thereby desengaging tooth 10 from notches 8 and thus permitting actuating ring 16 to move under the thrust of spring 18 along stem 1 and to act on the eccentric contact edges 22 to urge movable elements 3 to cause their free ends to approach each other with a snap into closed relationship, whereupon the apparatus will have its parts disposed as illustrated in Figures 2 and 3.

In order to load the apparatus again, it is turned upside down, the end of stem 1 provided with ring 21 is pressed against a suitably firm surface and ring 16 is gripped and pressed down, whereupon spring 18 will be compressed, movable elements 3 will by gravity, open, and at the moment when both notches 8 are in alinement latch 9 will drop by gravity, engaging tooth 10 in both notches. On releasing ring 16, the apparatus will be loaded. Now, if hook 13 has previously been baited the apparatus thus loaded according to the foregoing description, may be suspended from a line passing through suspension ring 21 and let down into a suitable place ready for fishing. If the agent producing the small effort mentioned above is a fish pulling on the bait on hook 13, thus causing the release or discharge of the apparatus, the movable elements 3 will snap into closed position, and the sharp ends 4 will be driven into the fish.

It is obvious that this invention provides apparatus which, besides being used as a fishing tackle, may be employed for catching other animals, by using an appropriate bait and conveniently arranging the suspension or supporting means. Moreover, although I have described my invention with particular reference to a preferred embodiment, I do not desire to be limited thereby but may make such modifications thereof and changes therein as lie within the scope of the appended claims.

I claim:

1. An apparatus for capturing animals comprising a stem, spaced parallel legs at one end of the stem, a plurality of movable elements each having a head portion at one end and animal piercing means at the other end, and including a latching notch at one side of the head and a contact edge at the side of said head remote from said notch, said elements being pivoted at said heads to said legs for movement between an open loaded position in which the respective animal piercing means are substantially separated and the notches are positioned in alignment with the longitudinal axis of the stem and a closed discharged position in which said animal piercing means are in close proximity to each other and the notches are positioned transversely of said stem, a guide ring surrounding the ends of said legs, a slotted member slidably mounted between said legs within said guide ring and including a latching member at one end and a baitable means at the other end thereof, a pin passing transversely between said legs and through said slotted member to permit sliding movement thereof lengthwise of the stem while preventing separation thereof from said stem, said latching member being located on the same side of the movable elements as said notches when the elements are in the open loaded position, an actuating member slidably mounted on said stem on the side of the elements remote from said slotted member, said actuating member having a surface simultaneously engageable with the contact edges of said elements, an abutment on said stem on the side of the actuating member remote from the elements and spaced therefrom and a spring surrounding said stem and extending between said abutment and said actuating member to urge said actuating member towards said legs.

2. An apparatus for capturing animals comprising a stem, spaced parallel legs extending in the lengthwise direction of said stem from one end thereof, a plurality of movable platelike elements each having animal piercing means at one end and at the other a head portion including a laterally offset portion comprising a latching notch, each of said elements including a contact edge on the side of the element remote from the offset portion, said elements being pivoted at said head to said legs for movement between an open loaded position in which said animal piercing means are substantially separated and said notches are positioned in alignment with the longitudinal axis of said stem, and a closed discharged position in which said animal piercing means are in close proximity to each other and said notches are directed substantially transversely of said stem axis, a guide ring on the lower end of said stem, a slotted member slidably mounted between said legs within said guide ring and comprising latching means at one end and baitable means at the other, a pin secured to said legs and extending transversely through said slotted member, an actuating member slidably mounted on the stem and including a surface engaging simultaneously the contact edges of said elements, an abutment fastened on said stem and spaced away from said legs and a spring surrounding said stem and having one end engaging said actuating member and the other engaging said abutment.

3. An apparatus for capturing animals comprising a central stem, at least two animal holding hooks pivoted adjacent the lower end of said stem and swingable outwardly to a set position and inwardly to an animal holding position, said hooks having notches therein adapted to be aligned when the hooks are swung outwardly, a guide ring on the lower end of said stem, a latching element having a bait hook at its lower end and slidably mounted on said stem within said ring and adapted to engage in the notches in said animal holding hooks, and a spring on said stem adapted to drive the animal holding hooks downwardly when released by the latching element.

4. An apparatus for capturing animals comprising a central stem, at least two animal holding hooks pivoted adjacent the lower end of said stem swingable outwardly to a set position and inwardly to an animal holding position, said hooks having notches therein adapted to be aligned when the hooks are swung outwardly, a guide ring on the lower end of said stem, a latching element having a bait hook at its lower end and slidably mounted on said stem within said ring and adapted to engage in the notches in said animal holding hooks, a ring surrounding said stem and engageable with said animal holding hooks, and a spring on said stem abutting said ring and adapted to drive the animal holding hooks downwardly when released by the latching element.

5. An apparatus for capturing animals comprising a central stem, at least two animal holding hooks pivoted adjacent the lower end of said stem and swingable outwardly to a set position and inwardly to an animal holding position, said hooks having notches therein adapted to be aligned when the hooks are swung outwardly, a guide ring on the lower end of said stem below the pivot point of said hooks, a latching element slidably mounted in the guide ring and having a bait hook at its lower end and adapted to engage in the notches in said animal holding hooks, and a spring on said stem adapted to drive the animal holding hooks downwardly when released by the latching element.

6. An apparatus for capturing animals comprising a central stem slotted at its lower end, at least two animal holding hooks pivoted within the slotted portion and swingable outwardly to a set position and inwardly to an animal holding position, said hooks having notches therein adapted to be aligned when the hooks are swung outwardly, a guide cap on the lower end of said stem having a central aperture therein, a latching element slidably mounted in the slotted portion of the stem and in the guide cap extending through the central aperture in the latter, said latching element having a bait hook adapted to engage in the notches in the animal holding hooks, and a spring on said stem adapted to drive the animal holding hooks downwardly when released by the latching element.

7. An apparatus for capturing animals, particularly fish, comprising a stem slotted at one end to define a pair of spaced parallel legs, a pivot pin hole in said legs perpendicular to the slot, a plurality of movable elements, each having one sharp end providing means for piercing said animal and pivot holes at the opposite end, said movable elements being mounted between said legs with the pivot holes in alignment with the pivot pin holes, a pivot pin passing through all of said holes, a latch member slotted to form a centrally disposed elongated slot and including a tooth at one end and a baitable member at the other end, said latch member being slidably mounted between said legs adjacent the end of the stem with said tooth adjacent said movable members, a guide ring surrounding the end of said stem with said latch member slidable therein, a pin securing said ring to said stem and passing freely through said elongated slot, an actuating ring slidably mounted on said stem on the side of the movable elements remote from the latch member, a collar secured to said stem at the end remote from the slotted end, a spring surrounding said stem between said actuating ring and said collar, notches in said movable elements positioned to cooperate with said tooth to releasably lock said movable members in operative position, and a suspension means mounted on the end of said stem remote from said legs.

TULIO HUMBERTO ANTONIO CORNALBA.

REFERENCES CITED

The following references are of record in the file of this patent:

UNITED STATES PATENTS

| Number | Name | Date |
|---|---|---|
| 50,799 | Crandell | Nov. 7, 1865 |
| 59,844 | King, Jr. | Nov. 20, 1866 |
| 596,334 | McWhirter | Dec. 28, 1897 |
| 696,013 | Doering | Mar. 25, 1902 |
| 793,810 | Wangen | July 4, 1905 |
| 873,231 | Hartshorn | Dec. 10, 1907 |
| 1,136,297 | Thayer | Apr. 20, 1915 |
| 1,180,120 | Evans | Apr. 18, 1916 |
| 1,796,197 | Galbraith | Mar. 10, 1931 |

FOREIGN PATENTS

| Number | Country | Date |
|---|---|---|
| 10,118 of 1943 | Australia | Aug. 11, 1943 |